Nov. 23, 1943.　　　J. F. NEUMUELLER　　　2,335,077
ORTHOPTIC INSTRUMENT
Filed Oct. 13, 1941

INVENTOR
JULIUS F. NEUMUELLER
BY
ATTORNEY

Patented Nov. 23, 1943

2,335,077

UNITED STATES PATENT OFFICE 2,335,077

ORTHOPTIC INSTRUMENT

Julius F. Neumueller, Dudley, Mass., assignor to American Optical Company, Southbridge, Mass., a voluntary association of Massachusetts Application October 13, 1941, Serial No. 414,814

3 Claims. (Cl. 128—76.5)

This invention pertains to orthoptic devices and more particularly to eye exercising means and method for stimulating visual perception.

Heretofore, eye exercising devices have been utilized wherein the fixation object was stationary and of appreciable size and increased brightness for the purpose of stimulating visual perception while fixation was maintained. The brightness referred to pertains to the use of colors, and also pertains to the use of a light source of high intensity.

The present invention pertains to a device for stimulating visual perception by employing a moving object field which in the present case is a chart or other visible fixation means or reading matter which is located on a table or board which oscillates. The extent of movement of the oscillating chart or reading matter may vary in extent and speed with the indicia on the chart preferably of such nature as to cause successive and progressive fixations and of given reading context to stimulate concentration during the treatment of the eyes.

Since the retina of the eye has certain units, which when stimulated give rise to perception of form, the movement of the stimulus makes the object much more attention provoking, and excites responses when a still object might fail to do so. The present invention, therefore, is intended to provide a movable stimulus for more strongly stimulating visual perception in an amblyopnic eye with a view to eventually bringing about visual coordination between the two eyes.

In amblyopic eyes, the visual acuity is diminished, this diminution being the result of dysfunction of the visual system. By providing a moving object, as in the present invention visual sensitivity may be improved by utilizing a movable test object.

It is therefore an object of the invention to provide a novel orthoptic instrument and method for increasing stimulation of visual perception.

A further object of the invention is to provide a device having a movable surface for bearing the fixation object.

A further object of the invention is to provide a novel means for providing agitation generally or a specific oscillation at a controlled rate, which rate may be variable and subject to change as the subject responds to treatment.

A further object of the invention is to provide an orthoptic device of the oscillating type to bring about the stimulation of visual perception.

Figure 1:
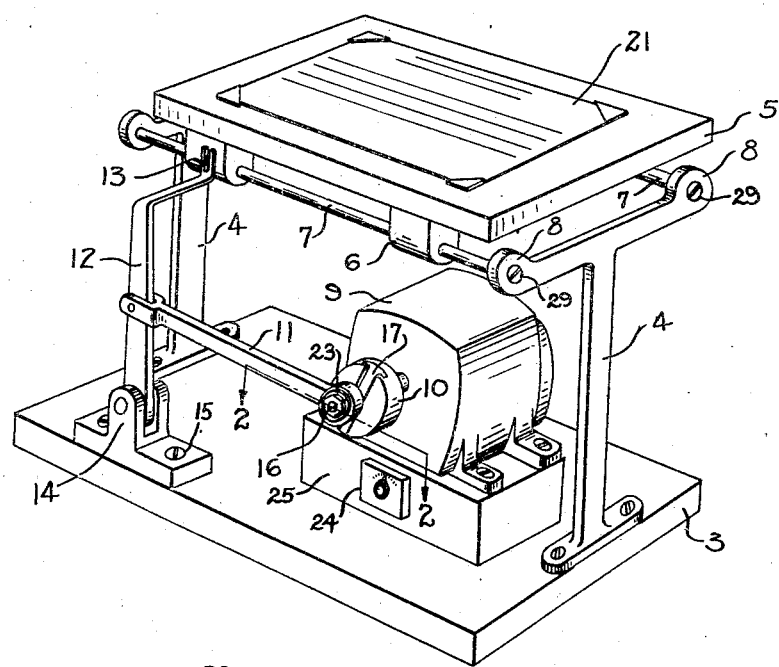
Fig. 1 is a perspective view of the orthoptic device having a fixation object thereon with means for oscillating same at a controlled rate.

Referring to the drawing, a base 3 has a pair of uprights 4 which support an oscillating rack 5, said rack having journalled members 6 secured thereto, which members have aligned openings therein to permit rods 7 to pass through said openings. Said rods 7 are secured to the journalled ear portions 8 on the upper end of the bracket 4 by means of screws 29 which are threadedly connected to the ends of the rods. A motor 9 has a grooved block 10 fixed on its shaft so that said block 10 may be rotated. A lever 11 is pivotally connected from the groove block 10 to a Z-shaped member 12. The upper portion of the Z-shaped member is slidably connected to a pin 13 while the lower end of the Z-shaped member is pivotally connected to a journal 14, which journal is affixed to the base 3 by screws 15.

The lever 11 has one end thereof pivotally connected to a stud 16, which stud is slidable in the groove 17 of the groove block 10 so that the stud may be adjustably moved to either side of the center of the shaft 18 of the motor to vary the throw of the lever 11.

Figure 2:
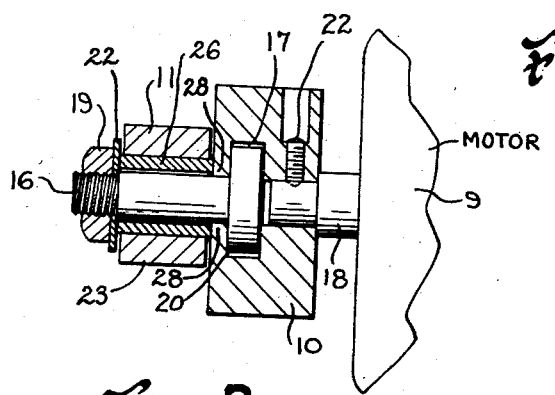
Fig. 2 is a sectional view taken along lines 2—2 of Fig. 1.

The enlarged sectional view shown in Fig. 2 shows the grooved block 10 as being secured to the end of the shaft 18 by a screw 22. The groove 17 is T-shaped in cross section to receive the stud 16 having its head 20 engaging the inner surfaces of the flanges 28. A collar 26 is cylindrical member which fits about a portion of the stud body so that the tightening of the nut 19 causes the washer 22 to engage the collar 26 and urge it securely against the outer surface of the flange 28. The tightening of the nut 19 causes the washer and outer surfaces of the flange 28 to grip the collar and hold it in fixed relation to the stud so that the collar thereafter does not rotate in relation to the stud, nor the stud 16 in relation to the block 10. The hub portion 23 of the lever 11 fits on the outside of the collar 26 so that the hub end of the lever 11 will rotate on the collar 26. With this arrangement, it will be seen that the stud 16 may be moved along the groove 17 so that an eccentric motion will be obtainable to provide oscillatory action for the lever 12 and the rack 5 carrying the chart 21 having the fixation indicia thereon. When the axis of the stud 16 is concentric with the shaft 18, no motion will be afforded the rack 5. The maximum motion of the rack 5 will be determined by the dimensions of the grooved block 10. The lever 11 may, if desirable, be connected directly to the rack 5 and the position of the motor may be changed to provide proper operation of the device.

From the foregoing, it will be seen that the location of the stud 16 on the groove block 10 will partially control the extent of the oscillation of the rack 5, while the speed of the motor will control the rapidity of oscillation of said rack. A rheostat 24 is electrically connected to the motor and is located on the motor block 25 for controlling the speed of the motor. However, it is to be understood that a gear box may be used with interchangeable gears to control the desired speed of oscillation by utilizing the preferred gear ratio to give the proper speed of oscillation.

While the journals 6 have been described as being connected to the underneath surface of the rack 5 and being slidable on the rod 7, it is also contemplated as an alternative arrangement of equivalent parts that the rods 7 remain stationary in relation to the rack and that the rod move slidably in journals such as in the ears 8. The particular method of slidably mounting the rack 5 may be varied satisfactorily as has been found from experimentation with this orthoptic instrument.

While a rotating motor has been set forth as being the motivating device, it is to be understood that any other equivalent motor may be used such as a contact operator solenoid or a vibrating machine. Any suitable motivating means may be employed which will provide adequate movement of the rack 5 when the device is in use.

While a certain specific structure has been shown herein for oscillating the rack, and means have been shown for controlling the speed of rotation of the motor, it is to be understood that any suitable means may be used for these purposes and it is not intended that the invention should be limited to the specific disclosure herein but may be changed and modified to embrace equivalent structures within the spirit of the subjoined claims.

The arrangement set forth above provides the following:

Means in the form of reading matter positioned within the field of vision of the amblyopic eye having a given context which stimulates concentration of the individual in attempting to assimilate said context.

Means in the form of an oscillating support for said reading context which introduces a rhythmic movement of the eye and requires increased effort upon the eye in attempting to read and assimilate said context.

The above means utilizes a given integrated pattern behavoir (reading behavoir) in such a way as to require greater effort on the part of the individual to read and assimilate said context.

In addition to the above the device is of such a nature as to vary said oscillatory movements and speed of movements as well as to introduce different reading context. The gist of the invention is to so combine the above means as to stimulate visual perception and fixation in the amblyopic eye. In using the device the initial treatment is conducted by blanking out or shunting the vision of the good eye so that all of the effort is directed to the amblyopic eye. As the amblyopic eye tends to return to its normal state or reaches a point where there is a possibility of coordination between the two eyes the treatment is conducted with both eyes simultaneously and thereby tends to bring about coordination between the two eyes.

While the device shows and describes mechanism for imparting an oscillatory movement to the stimulus means it is to be understood that any other desirable movement might be imparted to said stimulus means such as an irregular break-up motion, circular motion, combination motion or straight line movement in different selected meridians or a combined action imparted through the use of one or more of said movements depending upon the nature of the mechanism employed. The particular device therefore is shown only by way of illustration.

Having described my invention, I claim:

1. An instrument of the class described mounted on a base, for stimulating visual perception of an eye comprising a fixation target, support means for holding said fixation target, journals mounted on said support means, rod members slidably engaging said journal means to permit relative sliding movement therebetween, supports for said rod means connected to the base, a lever support connected to said base, a lever having one end thereof pivotally connected to said lever support and the opposing end thereof slidably connected to one of said bearings, a second lever having one end thereof pivotally connected intermediate the ends of said fixed lever with the opposing end of said second lever being pivotally connected to a stud having a head on one end thereof, a groove block adapted to receive the headed end of said stud, a motor means for rotating said groove block and means for securing said groove block to the motor means.

2. In an instrument of the class described a base having upright supports, said supports having spaced slide members thereon, a chart holder slidably connected to said slide members, a chart on said chart holder adapted to be positioned within the field of vision of an individual and having indicia thereon directly and simultaneously visible to both eyes and having characteristics which, when viewed and an attempt is made to assimilate the context of said indicia, will bring about progressive and successive fixations, a lever pivotally connected with the base adjacent one end thereof and connected with the chart holder adjacent the opposed end thereof, a motor on said base and link means connecting the motor with said lever whereby the chart holder and chart will be reciprocated in a direction transversely of the line of sight when the eyes are attempting to view and assimilate the context of the indicia on the chart.

3. In an instrument of the class described a base having upright supports, said supports having spaced slide members thereon, a chart holder slidably connected to said slide members, a chart on said chart holder adapted to be positioned within the field of vision of an individual and having reading matter of related context thereon directly and simultaneously visible to both eyes and having characteristics which, when viewed and an attempt is made to assimilate the context of said reading matter, will bring about progressive and successive fixations, a lever pivotally connected with the base adjacent one end thereof and connected with the chart holder adjacent the opposed end thereof, a motor on said base and link means connecting the motor with said lever whereby the chart holder and chart will be reciprocated in a direction transversely of the line of sight when the eyes are attempting to view and assimilate the context of the reading matter on the chart.

JULIUS F. NEUMUELLER.